US007197950B2

(12) United States Patent
Maxwell et al.

(10) Patent No.: US 7,197,950 B2
(45) Date of Patent: Apr. 3, 2007

(54) SYSTEM FOR TEMPERATURE-CONTROLLED TESTING OF HYDRAULICALLY ACTUATED DEVICES

(75) Inventors: Scott D. Maxwell, Renton, WA (US); Dale H. Smith, Renton, WA (US); Marcus A. Topp, Orting, WA (US)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 10/710,713

(22) Filed: Jul. 29, 2004

(65) Prior Publication Data

US 2006/0021654 A1 Feb. 2, 2006

(51) Int. Cl.
*G01P 21/00* (2006.01)
*G01P 1/02* (2006.01)

(52) U.S. Cl. .................... 73/865.6; 73/49.7; 73/117.1; 73/118.1

(58) Field of Classification Search .................... 73/40, 73/40.5, 46, 49.7, 49.8, 52, 117.1, 117.2, 73/118.1, 132, 865.6, 865.9, 45.5; 702/114
See application file for complete search history.

(56) References Cited

U.S. PATENT DOCUMENTS 3,942,375 A * 3/1976 Shepherd .................... 73/168
4,368,638 A * 1/1983 Groves et al. ................ 73/168
4,385,518 A * 5/1983 Rickett ...................... 73/117
H000229 H * 3/1987 Phillips ...................... 165/96
4,798,086 A * 1/1989 Styfhoorn .................... 73/168
5,039,228 A * 8/1991 Chalmers ..................... 374/57
5,339,677 A * 8/1994 Haug ......................... 73/49.5
5,585,549 A * 12/1996 Brevick et al. .............. 73/49.7
5,992,948 A * 11/1999 Gowda ........................ 303/116.1
2004/0129054 A1* 7/2004 Hyme ......................... 73/1.72

FOREIGN PATENT DOCUMENTS

EP 225397 A1 * 6/1987
JP 55029751 A * 3/1980
SU 1733725 A1 * 5/1992

OTHER PUBLICATIONS

"Cryogenic Testing of an Aircraft Hydraulic Pump", Mechanical Solutions, Inc., Aug. 9, 2002,pp. 1-2.*

* cited by examiner

*Primary Examiner*—Hezron Williams
*Assistant Examiner*—David A. Rogers
(74) *Attorney, Agent, or Firm*—Ostrager Chong, Flaherty & Broitman, P.C.

(57) ABSTRACT

A temperature controlled hydraulic fluid supply circuit (12) includes a first hydraulic fluid reservoir (18), that has an initial hydraulic fluid (20), and a temperature controlled housing (45). A second hydraulic fluid reservoir (26) is fluidically coupled to the first hydraulic fluid reservoir (18), resides within the temperature controlled housing (45), and has a controlled hydraulic fluid (14) that is supplied to a test device (16). A circulation device (60) circulates a temperature altering fluid (62) through the temperature controlled housing (45) and adjusts the temperature of the controlled hydraulic fluid (14).

31 Claims, 2 Drawing Sheets

SYSTEM FOR TEMPERATURE-CONTROLLED TESTING OF HYDRAULICALLY ACTUATED DEVICES

BACKGROUND OF INVENTION

The present invention relates generally to hydraulic fluid systems and components thereof. More particularly, the present invention is related to a system for testing the performance of a hydraulic system or hydraulic component under various controlled operating temperatures.

Hydraulic systems and components exist throughout industry and are utilized to perform various tasks. Hydraulic systems and components exist in aerospace, automotive, naval, and railway industries, as well as in other transportation and non-transportation industries. It is common for many of these hydraulic components to be operated in largely varying or extreme temperature operating environments. When operated in such an environment the performance of the systems and components is significantly reduced.

For example, a hydraulic control valve of an aircraft may be operated at temperatures near approximately −60° F. At such extreme temperatures the characteristics and viscosity of the hydraulic fluid is altered such that the fluid has the consistency of peanut butter rather than that of a free flowing oil at room temperature, which is desired. This reduction in fluid consistency significantly and negatively affects the performance of the hydraulic control valve. In addition to the change in hydraulic fluid consistency, component dimensions, clearances, and elasticities also change with temperature, which can also negatively affect component performance.

It is also known to physically insert the hydraulic systems and components into a freezer for cold temperature testing. These known techniques for testing hydraulic systems and components are time consuming and costly and in some instances, such as when a freezer is utilized, can require large testing equipment.

There is also a desire to test hydraulic systems and components in a controlled temperature environment such that performance changes that may occur at specified temperatures or in temperature ranges can be monitored, measured, and evaluated. It is desired that the temperature of the hydraulic fluid and the test component be altered to a set operating temperature in a reliable and measurable manner.

Thus, there exists a need for an improved and reliable system and method of evaluating and analyzing the performance changes of a hydraulic system or component in various temperature operating environments.

SUMMARY OF INVENTION

In one embodiment of the present invention a temperature controlled hydraulic fluid supply circuit is provided. The circuit includes a first hydraulic fluid reservoir, that has an initial hydraulic fluid, and a temperature controlled housing. A second hydraulic fluid reservoir is fluidically coupled to the first hydraulic fluid reservoir, resides within the temperature controlled housing, and has a controlled hydraulic fluid that is supplied to a test device. A circulation device circulates a temperature altering fluid through the temperature controlled housing and adjusts the temperature of the controlled hydraulic fluid.

The embodiments of the present invention provide several advantages. One such advantage is the ability to test one or more hydraulic components in a reliable temperature controlled environment. This ability is provided through the use of a simulated test environment and without the need of large test equipment.

Another advantage provided by an embodiment of the present invention is the provision of a temperature controlled hydraulic fluid supply circuit, which provides hydraulic fluid at a predetermined temperature to the test component of concern. The test component and the hydraulic fluid supplied may be maintained approximately at that predetermined temperature. This provides a reliable and accurate technique of evaluating a hydraulic component at a desired operating temperature.

Yet another advantage provided by an embodiment of the present invention is the provision of a hydraulic system and component test system that monitors and maintains a hydraulic test system or component at a desired operating temperature and allows for the altering of that desired temperature. Thus, a hydraulic component may be tested in multiple simulated operating environments using a single test system.

A further advantage provided by embodiments of the present invention is the ability to evaluate the performance of hydraulic components efficiently and inexpensively.

The present invention itself, together with further objects and attendant advantages, will be best understood by reference to the following detailed description, taken in conjunction with the accompanying drawing.

DETAILED DESCRIPTION

Figure 1:
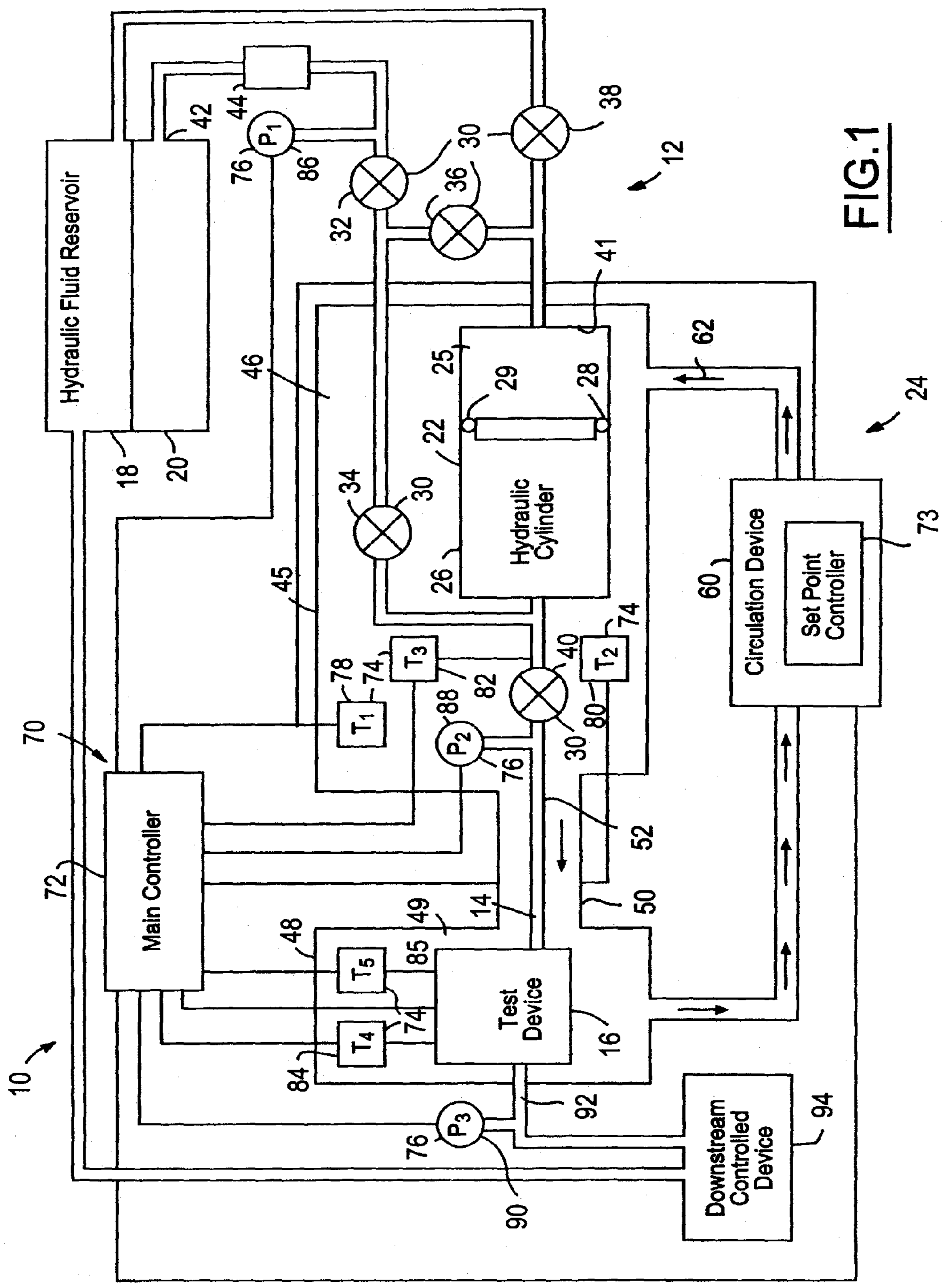
FIG. 1 is a block diagrammatic and schematic view of a hydraulic device test system in accordance with an embodiment of the present invention.

It has been observed that it can be difficult to maintain the temperature of a hydraulic fluid supply from a hydraulic pump. As a hydraulic pump is operated temperature of the hydraulic fluid therein increases due to fluid shear and friction of components within a closed loop system. Thus, even when the hydraulic fluid is cooled prior or subsequent to entering the hydraulic pump, the hydraulic fluid only remains cooled momentarily until being cycled through the pump. Since hydraulic fluid systems typically have little heat sinking capability the components therein tend to increase in temperature. The increase in component temperatures prevents a hydraulic component and hydraulic fluid supplied to that component to be controlled in a test condition. Therefore, the present invention provides a system and method of controlling the temperature of a hydraulic supply fluid and a component or system being tested.

In the following Figures, the same reference numerals will be used to refer to the same components. While the present invention is described with respect to a system for testing the performance of a hydraulic system or hydraulic component thereof under various controlled operating temperatures, the present invention may be adapted to be used in various applications and applied to the testing of various hydraulic components within the aerospace, automotive, naval, railway, transportation, textile, farming, and other industries which utilize hydraulic components.

In the following description, various operating parameters and components are described for one constructed embodiment. These specific parameters and components are included as examples and are not meant to be limiting.

Referring now to FIG. 1, a block diagrammatic and schematic view of a hydraulic device test system 10 in accordance with an embodiment of the present invention is shown. The system 10 includes a hydraulic fluid test circuit 12, which provides a hydraulic fluid 14 at a controlled temperature to a hydraulic test device 16. The test device 16 may be in the form of a test system(s), a test component(s), or a combination thereof. The test circuit 12 includes a hydraulic fluid supply tank or first hydraulic fluid reservoir 18 having an initial hydraulic fluid 20. The initial fluid 20 is supplied to a hydraulic cylinder 22, which provides the controlled hydraulic fluid 14 at a predetermined temperature to the test device 16. The test circuit 12 also includes a temperature adjusting circuit 24 that is utilized to adjust the temperature of the initial hydraulic fluid 20 that is supplied to the hydraulic cylinder 22 to form the controlled hydraulic fluid 14.

The hydraulic cylinder 22 or the pressure side 25 and the output side 26 thereof may be considered a second hydraulic fluid reservoir since each of which may contain a hydraulic fluid. A hydraulic piston 28, having a seal or ring 29, separates the pressure side 25 and the output side 26. The pressure side 25 receives the initial fluid 20, which forces the piston 28 to push the controlled fluid 14 out of the output side 26 to the test device 16. Actuation of the piston 28 is described in further detail below.

The flow of the controlled fluid 14 and the initial fluid 20 is adjusted via a set of valves 30, which includes an inlet valve 32, a fill valve 34, a pressure valve 36, a return valve 38, and an output valve 40. The valves 30 provide separation between the initial fluid 20 and the controlled fluid 14. The inlet valve 32 is coupled to the output 42 of the first reservoir 18 via a hydraulic pump 44. The fill valve 34 is coupled between the inlet valve 32 and the output side 26. The pressure valve 36 is coupled between the inlet valve 32 and the pressure side 25. The return valve 38 is coupled between the pressure side 25 and the first reservoir 18. In one embodiment of the present invention, the return valve 38 is in the form of a needle valve such that flow of hydraulic fluid out of the pressure side 25 is slow, which prevents the “slamming” of the piston 28 against a pressure side wall 41 of the hydraulic cylinder 22. The output valve 40 is coupled between the output side 26 and the test device 16. Operative configurations and control of the valves 30 is described below with respect to the logic flow diagrams of FIGS. 2 and 3. Of course, the valves 30 may be of various types and styles known in the art. The valves 30 may be manually or electronically operated.

The hydraulic cylinder 22 resides within a first temperature controlled housing 45. Any of the valves 30 may also reside within the first housing 45. In one example embodiment, the fill valve 34 and the output valve 40 reside within the first housing 45 to aid in the maintaining of the temperature of the controlled fluid 14. The first housing 45 is constructed to provide a temperature controlled fluid bath 46 for the hydraulic cylinder 22 and any valves contained within the first housing 45. The fluid bath 46 may be in an air or liquid state. The first housing 45 may be insulated and formed of various materials known in the art to aid in the maintaining of a constant internal temperature.

The test device 16 may reside within a second temperature controlled housing 48 similar to the first housing 45. The second housing 48 may be coupled in series with the first housing 45 via a coupling channel 50. The coupling channel 50 may contain an output hydraulic fluid line 52 that provides passage of the controlled fluid 14 from the output valve 40 to the test device 16. Internal mounting of the fluid line 52 within the channel 50 aids in the maintaining of the temperatures of the controlled fluid 14 flowing therein. The second housing 48 aids in maintaining a predetermined temperature of the controlled fluid 14 and of the test device 16 through enclosure and soaking thereof in a fluid bath 49 similar to the fluid bath 46. This soaking provides a true simulation of the temperature experienced in an intended operating environment of the test device 16.

The temperature adjusting circuit 24 includes a circulation device 60, which circulates a temperature adjusting fluid 62 through the first housing 45 and cools or warms the hydraulic cylinder 22 and any valves contained within the first housing 45. The adjusting fluid 62 may form the fluid baths 46 and 49 within the housings 45 and 48. The circulation device 60 may include or be formed of one or more fluid cooling and/or warming devices, such as a heat exchanger, a chiller, a pump, a fan, a blower, an air conditioning unit, an oven, or various other fluid temperature adjusting devices known in the art. The circulation device 60 may for example be in the form of a cool air-circulating device produced by Thermotron.RTM. Industries. When the second housing 48 is utilized the adjusting circuit 24 may also be coupled to and circulate a fluid therethrough. Although the circulation device 60, the first housing 45, and the second housing 48 are shown as being in one single continuous circuit having a single fluid circulating therein, the fluid circulating through the first housing 45 is not necessarily the same and may be different from the fluid flowing through the second housing 48. Multiple temperature adjusting circuits may be utilized to separately adjust the temperatures within the housings 45 and 48. A single continuous circuit aids in the maintaining of the controlled fluid 14 and the device 16 at an approximately constant temperature.

A control circuit 70 may be coupled to or included within the test circuit 12. The control circuit 70 may include a main controller 72 that adjusts and monitors the temperatures of the housings 45 and 48, the controlled fluid 14, the test device 16, and the initial fluid 20. The controller 72 may also adjust and monitor pressures of the fluids 14 and 20, as well as operate and actuate the test device 16. The control circuit 70 may also include a set point controller 73, which may be located within the circulation device 60. The set point controller 73 may adjust the temperature of the adjusting fluid 62 in response to the temperature within the housing 45. The main controller 72 may signal the set point controller a desired set point temperature for the adjusting fluid 62. The controllers 72 and 73 may be microprocessor based such as a computer with a central processing unit, a memory (RAM and/or ROM), and associated input and output buses. The controllers 72 and 73 may be in the form of an application-specific integrated circuit or may be formed of other logic devices known in the art. The controllers 72 and 73 may be a portion of a central main control unit or may be standalone controllers as shown.

The control circuit 12 may include multiple temperature sensors 74 and pressure sensors 76, which are coupled to the controller 72. In the embodiment shown, a first temperature sensor 78 resides within and detects the temperature within the first housing 45. A second temperature sensor 80 is coupled to and detects the temperature of the hydraulic cylinder 22. A third temperature sensor 82 is coupled to and detects the temperature of controlled fluid 14. A fourth temperature sensor 84 is coupled to and detects the temperature of the test device 16. A fifth temperature sensor 85 resides within and detects the temperatures within the second housing 48. The temperature sensors 74 may be in the form of thermocouples or in some other known form. A first pressure sensor 86 detects the pressure of the initial fluid 20 upon leaving the pump 44. A second pressure sensor 88 detects the pressure of the controlled fluid 14 upon leaving the output valve 40. A third pressure sensor 90 detects the pressure of the hydraulic fluid 92 exiting the test device 16. The pressure sensors 76 may be in the form of pressure transducers, pressure gauges, or in some other known form.

The system 10 may include other hydraulically actuated or operated and controlled devices 94 coupled downstream from the test device 16. Associated temperature controlled housing and circuitry (not shown) may also accompany the controlled devices 94 similar to that of the test device 16.

Figure 2:
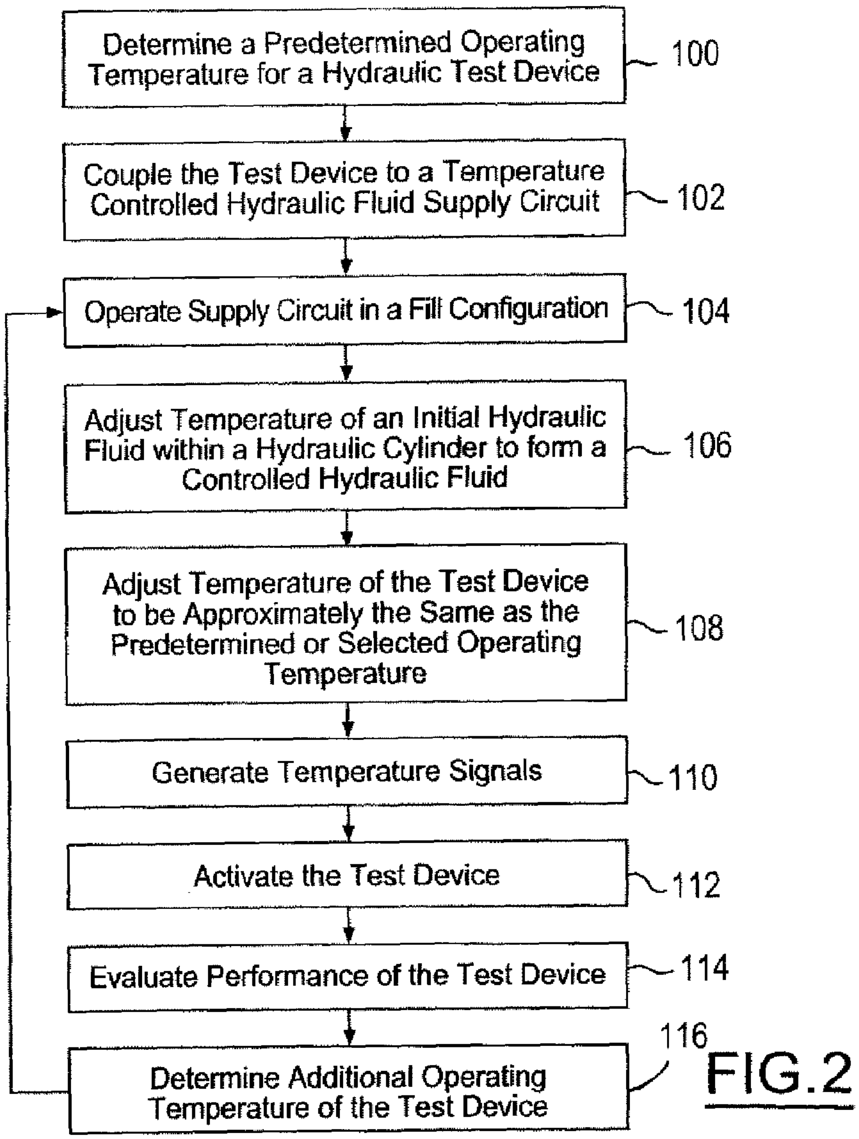
FIG. 2 is a logic flow diagram illustrating a method of testing one or more hydraulic devices in accordance with an embodiment of the present invention.

Referring now to FIG. 2, a logic flow diagram illustrating a method of testing at least one hydraulic component in accordance with an embodiment of the present invention is shown.

In step 100, a predetermined operating environment temperature is determined. An operating environment temperature corresponds with a simulated operating environment for which a hydraulic test device is to be operated and evaluated within.

In step 102, the test device is coupled to a temperature controlled hydraulic fluid supply circuit, such as the test circuit 12. The following steps are described with respect to the embodiment of FIG. 1, but may be easily modified to accommodate other embodiments of the present invention.

In step 104, the supply circuit 12 is operated in a "fill" configuration. In the fill configuration the inlet valve 32, the fill valve 34, and the return valve 38 are open. The pressure valve 36 and the output valve 40 are closed. The output side 26 is supplied with the initial fluid 20 until either the piston 28 is pushed fully to the pressure side 25 or until it is in a desired output supply position corresponding to a desired amount of fluid needed to actuate the test device 16 for a desired period of time or through a desired amount of cycles. The volume of the output side 26 can be predetermined based on the output supply position of the piston 28 and correlated with the desired amount of fluid needed to satisfy the cycle time or desired number of cycles of the test device 16. The desired volume of the output side 26 may be determined through multiplication of the desired number of cycles by the volume of the test device 16 needed per cycle. Hydraulic fluid within the pressure side 25 is passed through the return valve 38 back to the first reservoir 18.

In step 106, temperature of the initial fluid 20 is adjusted to form the controlled fluid 14. The inlet valve 32, the return valve 38, and the fill valve 34 are closed. The circulation device 60 is actuated to circulate the adjusting fluid 62 through the first housing 45. In step 108, the temperature of the test device 16 is adjusted to be approximately the same as the predetermined temperature. The circulation device 60 is actuated to circulate the adjusting fluid through the second housing 48. Step 108 and 106 may be performed simultaneously.

In step 110, the temperature sensors 74 generate temperature signals. Small temperature shifts in the controlled fluid 14, in the hydraulic cylinder 22, or in the housings 45 and 48 may be determined. In step 112, when the temperatures within the hydraulic cylinder 22, the housings 45 and 48, and the test device 16 are within a desired operating temperature range the test device 16 is actuated through supply of the controlled fluid 14. The controller 72 operates the test circuit 12 in a "use" configuration. The inlet valve 32, the pressure valve 36, and the output valve 40 are opened. The fill valve 34 and the return valve 38 remain closed. Pressure of the initial fluid pushes the piston 28, which in turn pushes the controlled fluid 14 out of the hydraulic cylinder 22 through the line 52 to the test device 16.

In step 114, performance of the test device 16 is evaluated.

Steps 100–114 may be performed when performing a cold or warm test. However, when a warm test is performed, in other words when the circulation device 16 is not cooling the housings 45 and 48, the test circuit 12 may be operated in a bypass configuration. The initial fluid 20 is directly supplied to the test device 16. The inlet valve 32, the fill valve 34, and the output valve 40 are opened and the pressure valve 36 and the return valve 38 are closed.

A truth table is provided in Table 1 for the fill, use, and bypass configurations. The letter "O" refers to when a valve is open and the letter "C" refers to when a valve is closed.

TABLE 1

Hydraulic Fluid Supply Circuit Configuration Truth Table

| | Inlet Valve | Fill Valve | Pressure Valve | Return Valve | Output Valve |
|---|---|---|---|---|---|
| Fill | O | O | C | O | C |
| Use | O | C | O | C | O |
| Bypass | O | O | C | C | O |

In step 116, a second or additional operating environment temperature is determined. The additional operating temperature may match an intended operating environment temperature of the test device 16 or may be some other testing temperature. Steps 104–114 are repeated such that the test device 16 is actuated utilizing the controlled hydraulic fluid 14 at the newly selected operating environment temperature. Steps 104–114 may be repeated any number of times.

Figure 3:
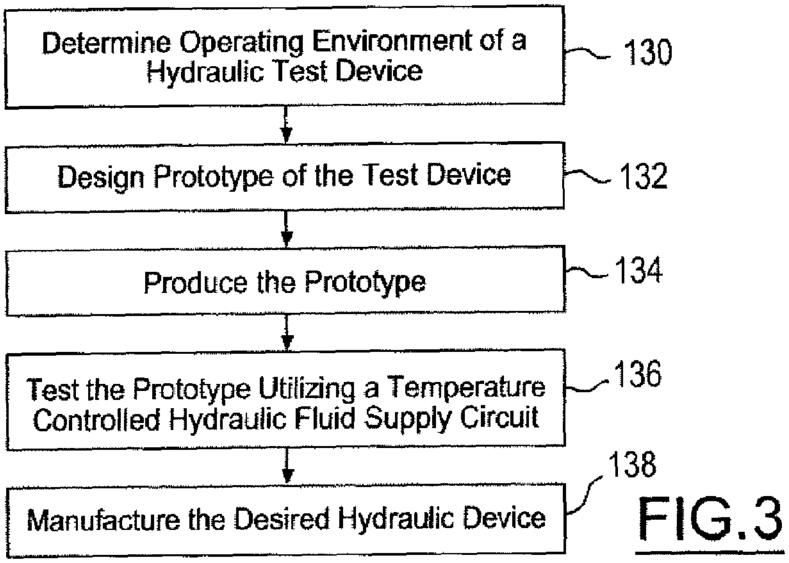
FIG. 3 is a logic flow diagram illustrating a method of producing a desired hydraulic device in accordance with an embodiment of the present invention.

Referring now to FIG. 3, a logic flow diagram illustrating a method of producing a desired hydraulic device in accordance with an embodiment of the present invention is shown.

In step 130, an operating environment(s) of the hydraulic device is determined. Operating temperatures or temperature ranges that the hydraulic device may experience during intended used are determined. In step 132, a prototype of the hydraulic device is designed in response to the operating environment. Various characteristics of the hydraulic device are determined, such as materials, component measurements and clearances, and other device characteristics known in the art. In step 134, the prototype is produced in response to the design specifications determined in step 132.

In step 136, the prototype is tested utilizing a temperature controlled hydraulic fluid supply circuit, such as the hydraulic fluid supply circuit 12. Steps 100–118 of the above-described testing method of FIG. 2 are performed. In step 138, the desired hydraulic device is manufactured in response to the results of the performance evaluation of step 114.

The above-described steps in the methods of FIGS. 2 and 3 are meant to be illustrative examples; the steps may be performed sequentially, synchronously, simultaneously, or in a different order depending upon the application.

The present invention provides a hydraulic system and component test system that allows for quick, reliable, and easy testing of hydraulic components before intended use thereof. The present invention ensures that a hydraulic component performs as desired once installed and utilized within the intended operating environment. This prevents the need for reworking or replacing hydraulic components of, for example, an aircraft when operating inappropriately in an extreme temperature environment due to prior lack of knowledge of such performance.

The above-described apparatus and method, to one skilled in the art, is capable of being adapted for various applications and systems known in the art. The above-described invention can also be varied without deviating from the true scope of the invention.

The invention claimed is:

1. A temperature controlled hydraulic fluid supply circuit comprising:

a first hydraulic fluid reservoir having an initial hydraulic fluid;

a first temperature controlled housing;

a second hydraulic fluid reservoir fluidically coupled to said first hydraulic fluid reservoir, residing within said first temperature controlled housing, and having a temperature controlled hydraulic fluid that is supplied to at least one test device; and a circulation device circulating a temperature altering fluid through said first temperature controlled housing and adjusting a temperature of said temperature controlled hydraulic fluid.

2. A circuit as in claim 1 wherein said second hydraulic fluid reservoir is in the form of a cylinder housing having a hydraulic piston.

3. A circuit as in claim 1 wherein said hydraulic fluid supply circuit comprises at least one configuration selected from a fill configuration, a use configuration, and a bypass configuration.

4. A circuit as in claim 1 wherein said temperature altering fluid is such to perform at least one test of said at least one test device selected from a cold test and a warm test.

5. A circuit as in claim 1 further comprising a plurality of hydraulic fluid control valves controlling flow of said initial hydraulic fluid and said temperature controlled hydraulic fluid and supplying said temperature controlled hydraulic fluid to said at least one test device.

6. A circuit as in claim 5 wherein said plurality of hydraulic fluid control valves separate said initial fluid from said temperature controlled fluid.

7. A circuit as in claim 1 further comprising a second temperature controlled housing containing said at least one test device therein.

8. A circuit as in claim 7 wherein said circulation device circulates said temperature altering fluid through said second temperature controlled housing and adjusts temperature of said at least one test device.

9. A hydraulic device test system comprising:

a hydraulic fluid test circuit comprising:

a first hydraulic fluid reservoir having an initial hydraulic fluid;

a first temperature controlled housing;

a second hydraulic fluid reservoir fluidically coupled to said first hydraulic fluid reservoir, residing within said temperature controlled housing, and having a temperature controlled hydraulic fluid;

a circulation device circulating a temperature altering fluid through said first temperature controlled housing and adjusting temperature of said temperature controlled hydraulic fluid; and a plurality of hydraulic fluid control valves controlling flow of said initial hydraulic fluid and said temperature controlled hydraulic fluid and supplying said controlled hydraulic fluid to at least one test device.

10. A test system as in claim 9 wherein said second hydraulic fluid reservoir is in the form of a cylinder housing having a hydraulic piston.

11. A test system as in claim 9 wherein said at least one hydraulic fluid control valve comprises:

an inlet valve controlling flow of said initial hydraulic fluid out of said first hydraulic fluid reservoir;

a return valve controlling flow of said initial hydraulic fluid out of said second hydraulic fluid reservoir; and an output valve controlling flow of said temperature controlled hydraulic fluid to said at least one test device.

12. A test system as in claim 9 wherein said temperature altering fluid is such to perform at least one test of said at least one test device selected from a cold test and a warm test.

13. A test system as in claim 9 further comprising at least one pressure sensor detecting at least one fluid pressure within said hydraulic fluid test circuit.

14. A test system as in claim 13 further comprising a controller coupled to said at least one pressure sensor and indicating said at least one fluid pressure.

15. A test system in claim 13, further comprising a pump coupled to said first hydraulic fluid reservoir and said second hydraulic fluid reservoir, said pump delivering said initial hydraulic fluid from said first hydraulic fluid reservoir to said second hydraulic fluid reservoir, wherein at least one of said plurality of hydraulic fluid control valves is an output valve of said second hydraulic fluid reservoir and wherein said at least one pressure sensor detects pressure of at least one fluid selected from said initial fluid upon leaving said pump and said temperature controlled hydraulic fluid upon leaving said output valve.

16. A test system as in claim 9 further comprising at least one temperature sensor detecting at least one temperature of at least one fluid within said hydraulic fluid test circuit.

17. A test system as in claim 16 wherein said at least one temperature sensor detects temperature of at least one of said first hydraulic fluid reservoir, said first temperature controlled housing, said second hydraulic fluid reservoir, said at least one test device, an output of said second hydraulic fluid reservoir, a second temperature controlled housing, said initial hydraulic fluid, said temperature controlled hydraulic fluid, and said temperature altering fluid.

18. A test system as in claim 16 further comprising a controller coupled to said at least one temperature sensor and indicating said at least one temperature.

19. A test system as in claim 18 wherein said controller adjusts said temperature adjusting fluid in response to said at least one temperature.

20. A test system as in claim 9 further comprising a second temperature controlled housing containing at least one test device therein.

21. A test system as in claim 20 wherein said circulation device circulates said temperature altering fluid through said second temperature controlled housing and adjusts temperature of said at least one test device.

22. A test system as in claim 20 wherein said second temperature controlled housing is fluidically coupled to said first temperature controlled housing.

23. A test system as in claim 20 wherein said first temperature controlled housing, said second temperature controlled housing, and said circulation device are in series and form a single continuous fluidic circuit.

24. A test system as in claim 9 wherein said second hydraulic fluid reservoir comprises:

an output side; and a pressure side.

25. A test system as in claim 24 wherein said output side receives said initial hydraulic fluid when said hydraulic fluid test circuit is operating in a fill configuration.

26. A test system as in claim 24 wherein said pressure side receives said initial hydraulic fluid when said hydraulic fluid test circuit is operating in a use configuration.

27. A test system as in claim 24 wherein neither said output side nor said pressure side receive said initial hydraulic fluid when said hydraulic fluid test circuit is operating in a bypass configuration.

28. A test system as in claim 24 wherein said at least one hydraulic fluid control valve comprises:

a fill valve controlling flow of said initial hydraulic fluid into said output side; and a pressure valve controlling flow of said initial hydraulic fluid into said pressure side.

29. A hydraulic device test system comprising:

a hydraulic fluid test circuit comprising:

a first hydraulic fluid reservoir having an initial hydraulic fluid;

a first temperature controlled housing;

a second hydraulic fluid reservoir fluidically coupled to said first hydraulic fluid reservoir, residing within said temperature controlled housing, and having a temperature controlled hydraulic fluid;

a circulation device circulating a temperature altering fluid through said first temperature controlled housing and adjusting temperature of said temperature controlled hydraulic fluid; and a plurality of hydraulic fluid control valves controlling flow of said initial hydraulic fluid and said controlled hydraulic fluid and supplying said temperature controlled hydraulic fluid to at least one test device;

at least one temperature sensor coupled to said hydraulic fluid test circuit and generating at least one temperature signal; and a controller coupled to said hydraulic fluid test circuit and said at least one sensor and adjusting at least one of said initial hydraulic fluid, said temperature controlled hydraulic fluid, temperature altering fluid in response to said at least one temperature signal.

30. A test system as in claim 29 wherein said controller signals said circulating device to alter temperature of said temperature controlled hydraulic fluid in response to said at least one temperature signal.

31. A test system as in claim 29 further comprising a second temperature controlled housing containing said at least one test device, said controller signaling said circulating device to alter temperature within said second temperature controlled housing in response to said at least one temperature signal.

* * * * *